Patented Nov. 21, 1939

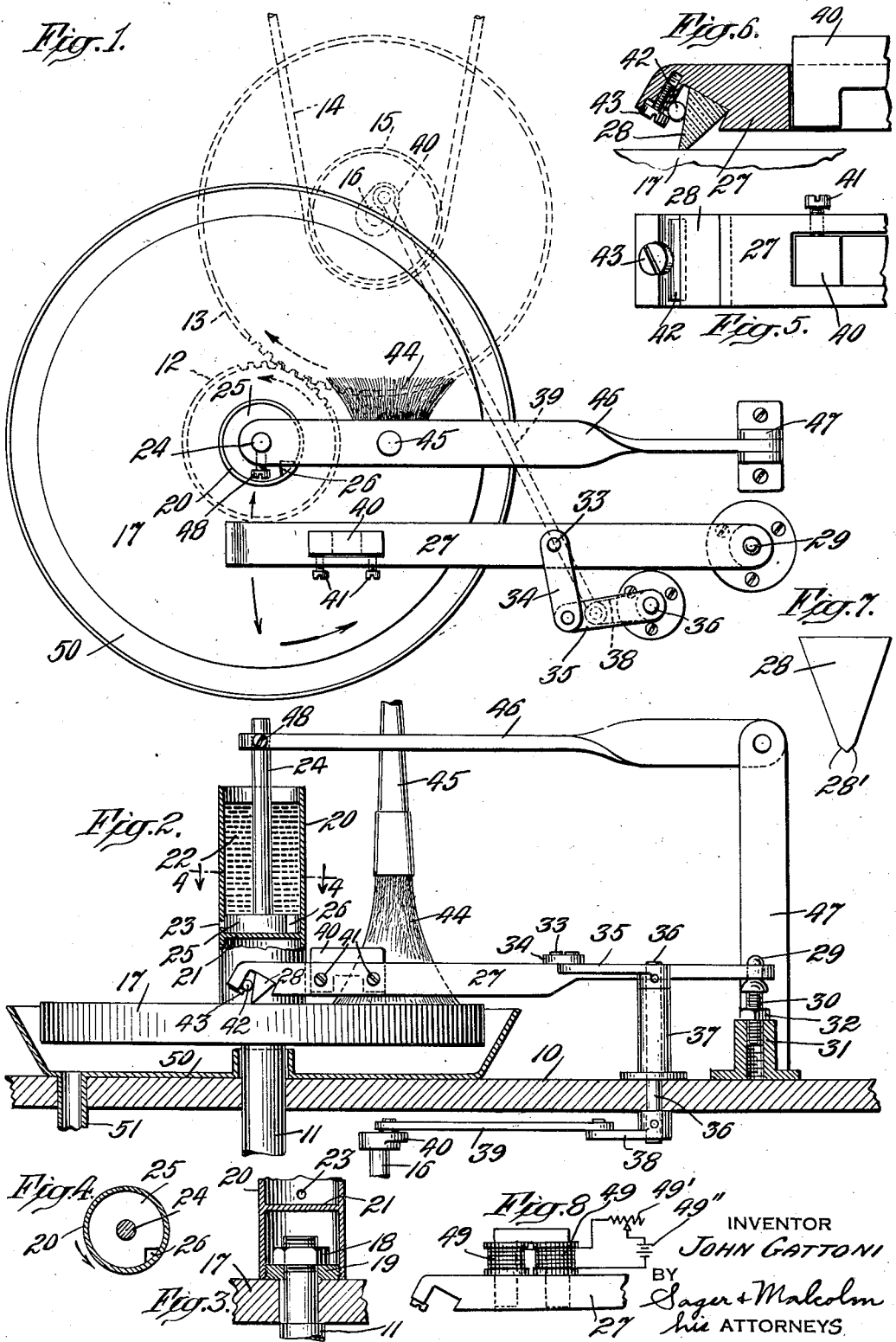

2,180,952

UNITED STATES PATENT OFFICE 2,180,952

APPARATUS FOR SHARPENING KNIFE-EDGES

John Gattoni, Union City, N. J., assignor to Seederer-Kohlbusch, Inc., Jersey City, N. J., a corporation of New Jersey Application February 10, 1938, Serial No. 189,722

6 Claims. (Cl. 51—124)

This invention particularly relates to sharpening knife-edges used for pivot bearings in the scale beam of precision balances and in similar uses but is also applicable to sharpening knife-edges used for other purposes when a fine straight edge is desired.

One object of the present invention is to provide a simple method and apparatus for forming a fine straight edge with a high degree of accuracy. Another object is to accomplish this by a device which may be operated continuously and which will avoid the necessity of hand finishing. Another object is to provide means for supplying the grinding material regularly in proper amounts and also for spreading it over the grinding plate. A further object is to provide simple means for retrieving the grinding material. Other objects and advantages of the invention will be understood from the following description and accompanying drawing.

Fig. 1 is a plan view illustrating a preferred embodiment of the invention; Fig. 2 is a front elevation partly in section; Fig. 3 is a vertical section showing a portion of the container for supplying the grinding material; Fig. 4 is a horizontal section of the container on the line 4—4 of Fig. 2; Fig. 5 is an enlarged plan view of the end portion of the carrier for the knife-edge; Fig. 6 is an enlarged vertical section of the portion of the carrier shown in Fig. 5; Fig. 7 is an enlarged end view of one form of knife-edge to which this invention is particularly applicable; and Fig. 8 is a side view of a portion of the carrier showing a modified form of magnet.

Referring to Figs. 1 and 2, the apparatus is mounted on any suitable base 10 through which upwardly projects a vertical shaft 11 driven by any suitable means, such as the gears 12 and 13, the latter being driven by any source of power, such as the belt 14 and pulley 15 mounted on the shaft 16 of the driving gear. On the upper end of the shaft 11 is mounted the grinding plate 17 in the form of a circular disc. This plate has a flat, smooth top surface and is made of magnetic material, such as iron or steel, for the reasons hereinafter explained. The plate is fixed to the shaft by a nut 18 which clamps the plate against a shoulder formed on the shaft as shown in Fig. 3. Between the nut 18 and the plate is clamped a washer 19, the outer surface of which is threaded. A central vertical tube 20 is threaded at its lower end onto the washer 19 and is provided with a horizontal partition 21 near its lower end, the upper portion of the tube serving as a container for supplying the grinding material 22. This tube rotates with the shaft 11 and is provided with a hole 23 in the side of the tube a little above the partition 21. A vertical stem 24 extends downwardly through the upper portion of the tube and carries a disc 25 at its lower end which seats against the partition 21. A notch or cut-away portion 26 is formed in the edge of the disc 25. The disc 25 does not revolve but the revolution of the tube 20 brings the hole 23 opposite the notch 26 once during each revolution of the tube and permits a suitable quantity of the grinding material 22 to be ejected from the tube onto the grinding plate 17.

The carrier for the knife edge is in the form of an arm 27 of non-magnetic material which extends over the grinding plate and carries the knife-edge 28 at its inner end, being pivotally mounted at its outer end on a vertically extending pin 29 which extends upwardly from the top of a screw 30 which engages a support 31 which in turn is secured to the base 10. A locknut 32 is provided for the screw to secure it in any desired position. By adjusting the screw 30, the outer end of the carrier may be raised or lowered and in this manner the angle of the bevel on the knife-edge may be conveniently adjusted within limits. Between the two ends of the carrier 27, a pin 33 extends upwardly from its top surface which is engaged by one end of a link 34, the other end of which is pivotally connected to an arm 35 which has one end fixed to a shaft 36 which is journaled in a vertical support 37 mounted on the base 10. An arm 38 is fixed to the lower end of the shaft 36 under the base 10 and to this arm is pivotally connected a link 39 which is also pivotally connected to an arm 40 which arm is fixed to the driving shaft 16. Obviously the rotation of the driving shaft will reciprocate the link 39 and the arm 38 and in turn reciprocate the arm 35 and link 34. This, of course, causes the swinging of the carrier arm 27 back and forth on its pivot 29. The inner end of the carrier is positioned with reference to the grinding plate 17 so that it swings back and forth approximately over a radius of the grinding plate.

Near the inner end of the carrier arm 27 and over the grinding plate is located a permanent magnet 40. This magnet is shown of U-form and its poles extend downwardly near the face of the grinding plate. It is located in an opening in the carrier arm of about the same size as the magnet and is adjustable vertically with reference to the carrier arm in order to increase or decrease the pressure exerted by the knife-edge against the grinding plate. This adjustment is accomplished by means of a pair of screws 41 which pass through the side of the carrier arm and impinge against the side of the magnet, the screws having a threaded engagement with the carrier arm. Obviously the magnet may be raised or lowered in its opening and secured in any desired position by the screws 41.

The means for holding the knife-edge 28 in fixed position at the inner end of the carrier arm is well shown in Fig. 6. The inner end of the arm has a cut-away rectangular portion at such an angle as to receive the knife edge 28 and hold it in proper position for forming the ground edge at a proper angle. The general form of the particular type of knife edge herein considered is triangular as shown in Fig. 7 and the ground edges 28' are at an angle to the sides of the triangle in order to produce a straight, fine bearing edge where it engages the bearing block. The knife-edge is held in position by a pin 42 which seats between one side of the knife edge 28 and a side of the cut-away portion of the carrier. A screw 43 is threaded upwardly into the outer end of the carrier and as it is screwed inwardly, its head engages the underside of the pin 42 and thus clamps the knife edge in a definite fixed position in the cut-away portion of the carrier. This means for securing the knife edge affords a convenient manner for permitting removal of the knife edge and its reversal when it is desired to grind the opposite side of it and also serves as a convenient means for replacing the knife-edge by others to be ground.

In order to distribute the grinding material over the face of the grinding plate, a brush 44 is positioned over the grinding plate and engages it so as to flare in the direction of rotation of the grinding disc as shown in Fig. 1. The brush is held in position by having its handle 45 project upwardly through a horizontally extending supporting strip 46. The outer end of this strip is vertically supported on a horizontal axis in the upper end of the standard or post 47, the lower end of which is fixed to the base 10. The strip is twisted so that its inner end may pass over the stem 24 of the feeding device and is secured to this stem by a set-screw 48.

Fig. 8 shows a modified form of magnet mounted in the carrier arm. Instead of being a permanent magnet, this is shown as an electro-magnet having downwardly extending poles within the carrier arm and having a pair of windings 49 enveloping each leg of the magnet above the carrier arm. The strength of this magnet may obviously be varied by adjusting the current of its winding and thereby adjust the pressure of the knife-edge against the grinding plate to any desired amount. For this purpose an adjustable resistance 49' is shown connected in series with the windings; and a constant potential source 49" is shown for supplying current to the windings through the adjustable resistance.

In positioning the magnet or magnets within the carrier arm, they should not only be centrally located in the arm but should have the poles at or near the lower face of the carrier arm for obtaining the best results. This not only brings the center of gravity of the carrier low but insures the obtaining of uniform and constant pressure throughout the length of the knife-edge against the grinding plate regardless of the swinging of the carrier back and forth and of the position of the carrier. This structure is far superior to placing a weight on the carrier arm for securing the desired pressure because in that case, the inertia of the weight as the arm swings back and forth tends to cause a tilting of the arm and imposing variable pressures on different portions of the contacting surface between the knife-edge and the grinding plate. This results in a considerable departure from the obtaining of a straight fine edge which, of course, is undesirable where a high degree of accuracy and fineness of the edge are desired. Microscopic tests of the edge produced by this apparatus have shown the results to be far superior to the use of the weight and that the magnetic force of attraction not only is constant but exerts a uniform pressure throughout the length of the contacing surfaces during the grinding operation.

In using this apparatus, the grinding material 22 is placed in the tube 20 in the form of a liquid or soft paste and is preferably a mixture of oil or water and a very finely ground grinding material such as rouge. With the parts in the position shown in the drawing, the driving shaft is started and the grinding plate is driven in the direction shown by the arrow in Fig. 1. The carrier arm is swung back and forth on its pivot 29 so as to swing the knife-edge back and forth over the rotating grinding plate as shown by the arrows at the end of the carrier in Fig. 1. The magnetic attraction between the magnet and the magnetic grinding plate serves to impose a constant and uniform pressure of the knife-edge against the grinding plate in all positions thereof because the magnet is at all times over the grinding plate and exerts the same attractive force regardless of change of position of the parts.

During each revolution of the driving shaft 11, the hole 23 in the container comes opposite the notch 26 and permits the ejection of a small portion of the grinding material upon the plate in front of the brush 44. When this passes under the brush, it is spread over the plate so that the knife-edge in all positions is uniformly supplied with the grinding material. This material tends to work outwardly over the surface of the grinding plate and ultimately falls off its edge where it is caught in a pan 50 below the grinding plate and then passes out through a discharge opening 51 from the pan into any suitable receptacle. This used material and fresh grinding material is poured into the top of the tube 20 as needed.

After the grinding of one side of the knife-edge has been completed, the link 34 is lifted from the top of the carrier and then the latter may be removed from the pin 29. The knife-edge 28 may then be reversed and the parts replaced for grinding the other side of the knife-edge.

It is evident that the parts may be readily assembled and disassembled and have the advantage of simplicity of construction. Although a preferred embodiment of the invention has been described, it is apparent that various modifications may be made according to particular requirements and adapted for grinding various forms of knife-edges without departing from the scope of the invention.

I claim:

1. Apparatus for sharpening knife-edges comprising a rotatable horizontal plate, a carrier for holding the knife-edge in engagement with said plate, a cylindrical container for the grinding material secured to the top of said plate and having its axis coinciding with that of the plate, and a fixed disc in the bottom of said container, said disc having a notch in its periphery and said container having an opening opposite the periphery of said disc whereby an intermittent feed of the grinding material to said plate is obtained.

2. Apparatus for sharpening knife-edges comprising a rotatable horizontal plate of magnetic material, a knife-edge carrier pivoted at one end and carrying the knife-edge at the other, a magnet secured to said carrier and facing said plate, said magnet being centrally located with reference to said carrier, a container for the grinding material secured to said plate and having its axis coincide with the axis of the plate, means for causing said material to be supplied intermittently, a spreader for distributing the material over said plate, and a receptacle under said plate for receiving said material from the periphery of the plate.

3. Apparatus for sharpening knife-edges comprising a rotatable grinding plate of uniform magnetic material, a carrier for the knife-edge on one side of said plate, and a magnet secured to said carrier on the same side of the plate as the carrier and knife-edge and facing said plate.

4. Apparatus for sharpening knife-edges comprising a rotatable grinding plate of uniform magnetic material, a carrier for the knife-edge on one side of said plate, a magnet secured to said carrier on the same side of the plate as the carrier and knife-edge and facing said plate, and driving means for oscillating said carrier across said plate.

5. Apparatus for sharpening knife-edges comprising a rotatable grinding plate of uniform magnetic material, a carrier for the knife-edge on one side of said plate, and a magnet secured to said carrier on the same side of the plate as the carrier and knife-edge and having its poles in juxtaposition to said plate, said magnet being centrally located between the sides of said carrier to impose uniform pressure on all portions of the knife-edge.

6. Apparatus for sharpening knife-edges comprising a rotatable grinding plate of uniform magnetic material, a carrier for the knife-edge on one side of said plate, a magnet secured to said carrier on the same side of the plate as the carrier and knife-edge and facing said plate, and adjustable means for changing the distance between said magnet and plate.

JOHN GATTONI.